US010849100B2

(12) United States Patent
Jang et al.

(10) Patent No.: US 10,849,100 B2
(45) Date of Patent: *Nov. 24, 2020

(54) METHOD AND APPARATUS FOR RECEIVING MULTIMEDIA BROADCAST/MULTICAST SERVICE IN MOBILE COMMUNICATION SYSTEM

(71) Applicant: Samsung Electronics Co., Ltd., Suwon-si (KR)

(72) Inventors: Jaehyuk Jang, Suwon-si (KR); Himke Van Der Velde, Zwolle (NL); Gert-Jan Van Lieshout, Staines (GB); Kyeongin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/682,612

(22) Filed: Apr. 9, 2015

(65) Prior Publication Data

US 2015/0215897 A1    Jul. 30, 2015

Related U.S. Application Data

(63) Continuation of application No. 13/585,368, filed on Aug. 14, 2012, now Pat. No. 10,757,682.

(51) Int. Cl.
*H04W 72/00* (2009.01)
*H04W 76/12* (2018.01)
(Continued)

(52) U.S. Cl.
CPC ........ *H04W 72/005* (2013.01); *H04L 12/189* (2013.01); *H04L 65/4076* (2013.01);
(Continued)

(58) Field of Classification Search
CPC ........... H04W 72/005; H04W 36/0072; H04W 76/022; H04W 12/02; H04W 76/002;
(Continued)

(56) References Cited

U.S. PATENT DOCUMENTS 7,437,178 B2   10/2008   Jeong et al.
7,636,332 B2   12/2009   Kwak et al.
(Continued)

FOREIGN PATENT DOCUMENTS

CN    101120611 A    2/2008
CN    101426256 A    5/2009
(Continued)

OTHER PUBLICATIONS

Qualcomm Incorporated; MBMS Assistance Information for idle and connected mode; 3GPP TSG-RAN WG2 #77; R2-120285; Feb. 6-10, 2012; Dresden, Germany.
(Continued)

*Primary Examiner* — Kwang B Yao
*Assistant Examiner* — Syed M Bokhari
(74) *Attorney, Agent, or Firm* — Jefferson IP Law, LLP

(57) ABSTRACT

An MBMS service reception method and an apparatus are provided for facilitating reception of Multimedia Broadcast/Multicast Service (MBMS) provided in the Long Term Evolution (LTE) system. The method for receiving MBMS in a radio communication system includes receiving User Service Description (USD) information including time information of the MBMS in a connected mode, determining whether a session of the MBMS has started based on the time information, and receiving, when the MBMS session has started, MBMS data of the MBMS session. The MBMS service reception method and apparatus of the present invention facilitates receiving the MBMS service.

13 Claims, 10 Drawing Sheets

Related U.S. Application Data

(60) Provisional application No. 61/646,473, filed on May 14, 2012, provisional application No. 61/602,047, filed on Feb. 22, 2012, provisional application No. 61/524,000, filed on Aug. 16, 2011.

(51) Int. Cl.

| | |
|---|---|
| *H04W 76/40* | (2018.01) |
| *H04W 4/06* | (2009.01) |
| *H04L 12/18* | (2006.01) |
| *H04L 29/06* | (2006.01) |
| *H04N 21/61* | (2011.01) |
| *H04N 21/6405* | (2011.01) |
| *H04W 36/00* | (2009.01) |
| *H04W 28/06* | (2009.01) |
| *H04W 74/08* | (2009.01) |
| *H04W 80/02* | (2009.01) |
| *H04W 88/02* | (2009.01) |

(52) U.S. Cl.
CPC ..... *H04N 21/6131* (2013.01); *H04N 21/6405* (2013.01); *H04W 4/06* (2013.01); *H04W 36/0072* (2013.01); *H04W 76/12* (2018.02); *H04W 76/40* (2018.02); *H04W 28/06* (2013.01); *H04W 74/08* (2013.01); *H04W 80/02* (2013.01); *H04W 88/02* (2013.01)

(58) Field of Classification Search
CPC ....... H04W 4/06; H04W 88/02; H04W 28/06; H04W 80/02; H04W 74/08; H04N 21/6131; H04N 21/6405; H04L 65/4076; H04L 12/189
USPC .......... 370/312, 252, 329, 213, 343
See application file for complete search history.

(56) References Cited

U.S. PATENT DOCUMENTS

| | | | | |
|---|---|---|---|---|
| 8,233,446 B2* | 7/2012 | Vedantham | ........... | H04W 36/02 370/329 |
| 8,260,292 B2* | 9/2012 | Fischer | ........... | H04W 48/12 370/328 |
| 2004/0131026 A1 | 7/2004 | Kim et al. | | |
| 2004/0180675 A1 | 9/2004 | Choi et al. | | |
| 2005/0090278 A1* | 4/2005 | Jeong | ........... | H04W 36/0055 455/525 |
| 2006/0030342 A1* | 2/2006 | Hwang | ........... | H04W 68/00 455/466 |
| 2006/0072516 A1 | 4/2006 | Jeong et al. | | |
| 2006/0126590 A1* | 6/2006 | Putcha | ........... | H04W 72/005 370/343 |
| 2008/0102749 A1 | 5/2008 | Becker | | |
| 2008/0318558 A1 | 12/2008 | Bouazizi et al. | | |
| 2009/0052364 A1 | 2/2009 | Gonsa et al. | | |
| 2009/0122740 A1* | 5/2009 | Bouazizi | ........... | H04W 72/005 370/312 |
| 2009/0177974 A1 | 7/2009 | Cox et al. | | |
| 2009/0316615 A1* | 12/2009 | Vedantham | ........... | H04L 65/608 370/312 |
| 2010/0265867 A1* | 10/2010 | Becker | ........... | H04W 72/005 370/312 |
| 2010/0272003 A1 | 10/2010 | Lee | | |
| 2010/0302988 A1 | 12/2010 | Becker | | |
| 2010/0315987 A1* | 12/2010 | Kuo | ........... | H04W 72/005 370/312 |
| 2011/0194428 A1* | 8/2011 | Wang | ........... | H04W 72/005 370/252 |
| 2012/0095846 A1 | 4/2012 | Leverant | | |
| 2012/0113948 A1 | 5/2012 | Kwon et al. | | |
| 2012/0236776 A1* | 9/2012 | Zhang | ........... | H04W 36/0007 370/312 |
| 2012/0250578 A1* | 10/2012 | Pani | ........... | H04W 48/12 370/254 |
| 2012/0303745 A1* | 11/2012 | Lo | ........... | H04W 4/021 709/217 |
| 2013/0229974 A1* | 9/2013 | Xu | ........... | H04W 36/08 370/312 |
| 2014/0044035 A1* | 2/2014 | Hwang | ........... | H04W 72/005 370/312 |
| 2014/0362759 A1* | 12/2014 | Lu | ........... | H04L 5/0064 370/312 |

FOREIGN PATENT DOCUMENTS

| | | |
|---|---|---|
| CN | 101766010 A | 6/2010 |
| JP | 2013-135386 A | 7/2013 |
| WO | 2011-007985 A3 | 1/2011 |

OTHER PUBLICATIONS

Qualcomm Incorporated et al.; System time and leap seconds; 3GPP TSG-CT WG1 Meeting #79; C1-122988; Aug. 6-10, 2012; Chicago, IL.

3GPP LTE; Universal Mobile Telecommunications System (UMTS); LTE; Multimedia Broadcast/Multicast Service (MBMS); Architecture and functional description (3GPP TS 23.246 version 9.5.0 Release 9); ETSI TS 123 246; V95.0; Jun. 14, 2010.

3GPP LTE; 3rd Generation Partnership Project; Technical Specification Group Services and System Aspects; Multimedia Broadcast/Multicast Service (MBMS); Protocols and codecs (Release 10); 3GPP TS 26.346 V10.0.0; Apr. 5, 2011.

Samsung; Introducing MBMS enhancements for REL-11; 3GPP TSG-RAN WG2 Meeting #79; R2-123859; Aug. 6, 2012; China.

3GPP; 3rd Generation Partnership Project; Technical Specification Group Services and System Aspects; Multimedia Broadcast/Multicast Service (MBMS); Protocols and codecs (Release 9); 3GPP TS 26.346; V9.4.1; Mar. 28, 2011.

LTE; Evolved Universal Terrestrial Radio Access (E-UTRA); Radio Resource Control (RRC); Protocol specification (3GPP TS 36.331 version 10.2.0 Release 10); ETSI TS 136 331; V10.2.0; Jul. 1, 2011.

Verizon Wireless, Alcatel-Lucent, Ericsson, ST-Ericsson, Motorola Mobility, Qualcomm Incorporated, "MBMS Multibands Cell Selection and Reselection", 3GPP TSG-RAN WG2#77 R2-120841; Feb. 10, 2012.

Qualcomm Incorporated, Verizon Wireless, Telefon AB LM Ericsson, ST-Ericsson SA, Alcatel-Lucent, "USD Signaling of Frequency Information", 3GPP TSG-SA WG4#69 S4-120602; May 15, 2012.

"LTE; Evolved Universal Terrestrial Radio Access (E-UTRA) and Evolved Packet Core (EPC); Common test environments for User Equipment (UE) conformance testing (3GPP TS 36.508 version 9.5.0 Release 9)", Technical Specification, European Telecommunications Standards Institute (ETSI), 650, Route Des Lucioles; F-06921 Sophia-Antipolis; France, vol. 3GPP RAN 5, No. V9.5.0, Jul. 1, 2011 (Jul. 1, 2011), XP014066447.

CATT, Corrections and Clarifications on UTRA related FGIs, 3GPP TSG-RAN WG2#77bis R2-121551, URL:http://www.3gpp.org/ftp/tsg_ran/WG2_RL2/TSGR2_77bis/Docs/R2-121551.zip, Mar. 19, 2012.

CATT, Corrections and Clarifications on UTRA related FGIs, 3GPP TSG-RAN WG2#77bis R2-121549, URL:http://www.3gpp.org/ftp/tsg_ran/WG2_RL2/TSGR2_77bis/Docs/R2-121549.zip, Mar. 19, 2012.

CATT, Analysis on FGIs for ¾-mode UE, 3GPP TSG-RAN WG2#77bis R2-121173, URL:http://www.3gpp.org/ftp/tsg_ran/WG2_RL2/TSGR2_77bis/Docs/R2-121173.zip, Mar. 19, 2012.

LG Electronics Inc: "FGI bit 25", 3GPP Draft; R2-113277; FGI Bit for Inter-Frequency Measurements and Reporting, 3rd Generation Partnership Project (3GPP), Mobile Competence Centre; 650, Route Des Lucioles; F-06921 Sophia-Antipolis Cedex; France, vol. RAN WG2, No. Barcelona, Spain; 20110509, May 3, 2011 (May 3, 2011), XP050495420, [retrieved on May 3, 2011].

Qualcomm Incorporated, Separate UE capability for FDD and TDD, 3GPP TSG RAN WG2 #74, R2-113059, May 9-13, 2011.

Qualcomm Incorporated, UE capability for FDD and TDD, 3GPP TSG RAN WG2 #73bis, R2-111868, Apr. 11-15, 2011.

(56) References Cited

OTHER PUBLICATIONS

Qualcomm Incorporated, Introduction of UE capability for handover between FDD and TDD, 3GPP TSG RAN WG2 #74, R2-113056, May 9-13, 2011.
Canadian Office Action dated Jan. 14, 2019, issued in Canadian Patent Application No. 2,844,603.
Korean Office Action dated Jan. 15, 2019, issued in Korean Patent Application No. 10-2012-0089549.
Korean Office Action dated Mar. 11, 2019, issued in Korean Patent Application No. 102012-0085793.
LG Electronics Inc. et al., R2-113282, Capability indication of handover support between LTE FDD and LTE TDD, 3GPP TSG RAN WG2 #74, May 3, 2011.
Nokia Corporation et al., R2-106934, UE capability signaling for CA and MIMO in REL10, 3GPP TSG RAN WG2 #72 Nov. 28, 2010.
HTC Corporation et al., R2-100769, Correction to field descriptions of UE-EUTRA-Capability, 3GPP TSG RAN WG2 #68bis Jan. 21, 2010.
Korean Office Action dated Jun. 17, 2019, issued in Korean Patent Application No. 10-2019-0068946.
Chinese Office Action dated Apr. 3, 2020, issued in a counterpart Chinese Application No. 201710709108.1.
(Re)Selecting Appropriate Frequency/Cell for Service Continuity, 3GPP TSG-RAN WG2 Meeting #74, May 9-12, 2011, Barcelona, Spain.

\* cited by examiner

METHOD AND APPARATUS FOR RECEIVING MULTIMEDIA BROADCAST/MULTICAST SERVICE IN MOBILE COMMUNICATION SYSTEM

CROSS-REFERENCE TO RELATED APPLICATION(S)

This application is a continuation application of a prior application Ser. No. 13/585,368, filed on Aug. 14, 2012, which claimed the benefit under 35 U.S.C. § 119(e) of a U.S. Provisional application filed on Aug. 16, 2011 in the United States Intellectual Property Office and assigned Ser. No. 61/524,000, and of a U.S. Provisional application filed on Feb. 22, 2012 in the United States Intellectual Property Office and assigned Ser. No. 61/602,047, and of a U.S. Provisional application filed on May 14, 2012 in the United States Intellectual Property Office and assigned Ser. No. 61/646,473, the entire disclosure of each of which is hereby incorporated by reference.

BACKGROUND OF THE INVENTION

1. Field of the Invention:

The present invention relates to a mobile communication system. More particularly, the present invention relates to a method and apparatus for receiving Multimedia Broadcast/Multicast Service (MBMS) provided in the Long Term Evolution (LTE) system.

2. Description of the Related Art:

With the rapid advance of radio communication technologies, communication systems have evolved in stepwise manner. The Long Term Evolution (LTE) system is a representative 4th generation mobile communication system. The LTE system supports diverse services including broadcast services.

The LTE system supports the Multimedia Broadcast/Multicast Service (MBMS) such that the terminal supporting MBMS is capable of receiving the MBMS service subscribed by the user within the network providing the MBMS service.

However, the MBMS service of the related art has a drawback in that it is difficult to determine whether a specific MBMS service session has started with the MBMS service protocol. Also, when the MBMS service is provided on multiple frequencies, there is a need of defining the rule for the terminal to select the base station operating on one of the frequencies.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention to provide a method and apparatus for determining whether the Multimedia Broadcast/Multicast Service (MBMS) service session has started in the wireless mobile communication system providing the MBMS service by transmitting data on more than one uplink carrier.

Another aspect of the present invention to provide a method and apparatus for the terminal receiving the MBMS service to stay on the frequency carrying the MBMS service while moving.

In accordance with an aspect of the present invention, a method for receiving Multimedia Broadcast/Multicast Service (MBMS) in a radio communication system is provided. The method includes receiving User Service Description (USD) information including time information of the MBMS in a connected mode, determining whether a session of the MBMS has started based on the time information, and receiving, when the MBMS session has started, MBMS data of the MBMS session.

In accordance with another aspect of the present invention, a method for receiving Multimedia Broadcast/Multicast Service (MBMS) in a radio communication system is provided. The method includes selecting a base station to camp on after entering an idle mode, determining, when an MBMS session starts, whether User Service Description (USD) information including frequency information of the MBMS is stored, performing, when the USD information is stored, cell reselection based on the frequency information, and receiving MBMS data of the MBMS session from the reselected cell.

In accordance with another aspect of the present invention, a terminal for receiving Multimedia Broadcast/Multicast Service (MBMS) in a radio communication system is provided. The terminal includes a transceiver for transmitting and receiving data, and a controller for controlling reception of User Service Description (USD) information including time information of the MBMS in a connected mode, for determining whether a session of the MBMS has started based on the time information, and for receiving, when the MBMS session has started, MBMS data of the MBMS session.

In accordance with another aspect of the present invention, a terminal for receiving Multimedia Broadcast/Multicast Service (MBMS) in a radio communication system is provided. The terminal includes a transceiver which transmits and receives data, a storage which stores User Service Description (USD) information, and a controller which controls selecting a base station to camp on after entering an idle mode, determining, when an MBMS session starts, whether User Service Description (USD) information including frequency information of the MBMS is stored, performing, when the USD information is stored, cell reselection based on the frequency information, and receiving MBMS data of the MBMS session from the reselected cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
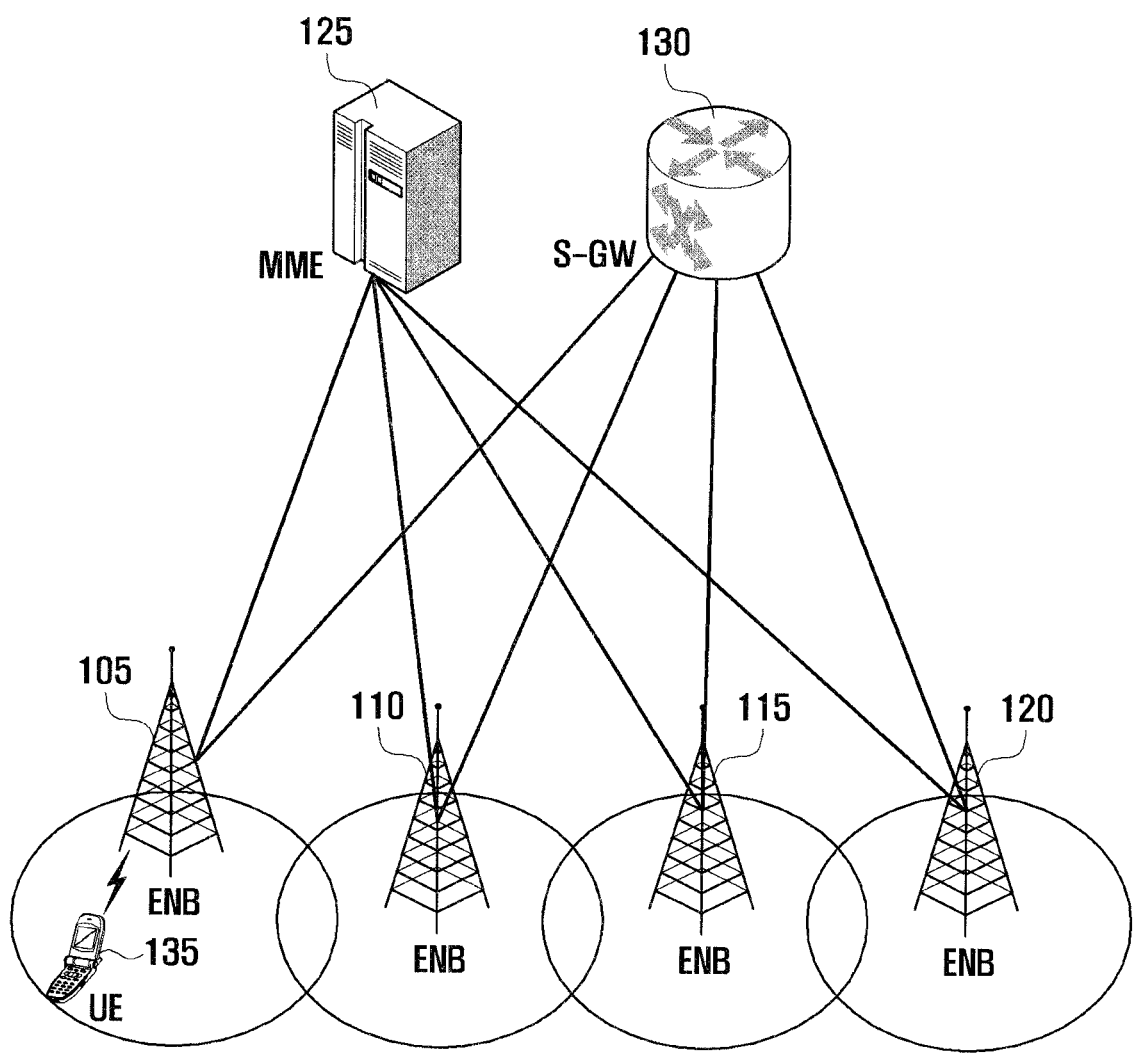
FIG. 1 is a diagram illustrating the architecture of an LTE system according to an exemplary embodiment of the present invention.

FIG. 1 is a diagram illustrating the architecture of an LTE system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (UE) 135 connects to an external network via eNBs 105, 110, 115, and 120 and the S-GW 130.

The eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state.

Typically, one eNB controls a plurality of cells. In order to secure a data rate of up to 100 Mbps, the LTE system adopts Orthogonal Frequency Division Multiplexing (OFDM) as a radio access technology. The LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for various control functions and connected to a plurality of eNBs 105, 110, 115, and 120.

Figure 2:
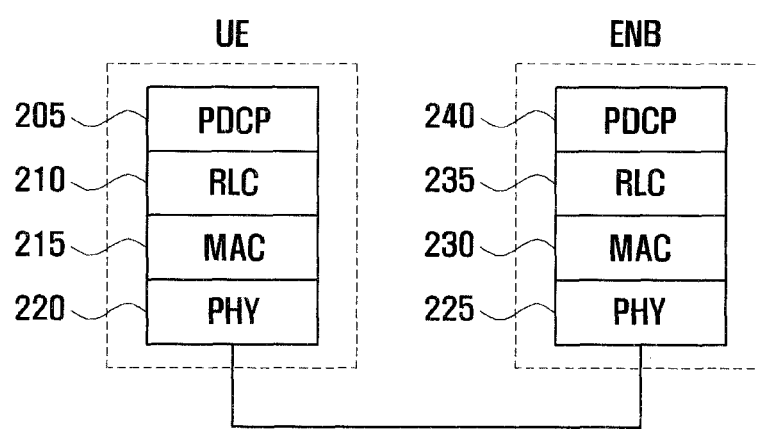
FIG. 2 is a diagram illustrating a protocol stack of the LTE system according to an exemplary embodiment of the present invention.

FIG. 2 is a diagram illustrating a protocol stack of an LTE system according to an exemplary embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225.

The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. ARQ is a process for determining whether the packet transmitted by the transmitted is received by the received successfully and retransmitting the packets received erroneously. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

The PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK information corresponding to the uplink transmission is transmitted on the Physical Hybrid-ARQ Indicator Channel, and the uplink HARQ ACK/NACK information may be transmitted on the Physical Uplink Control CHannel (PUCCH) or Physical Uplink Shared Channel (PUSCH).

Figure 3:
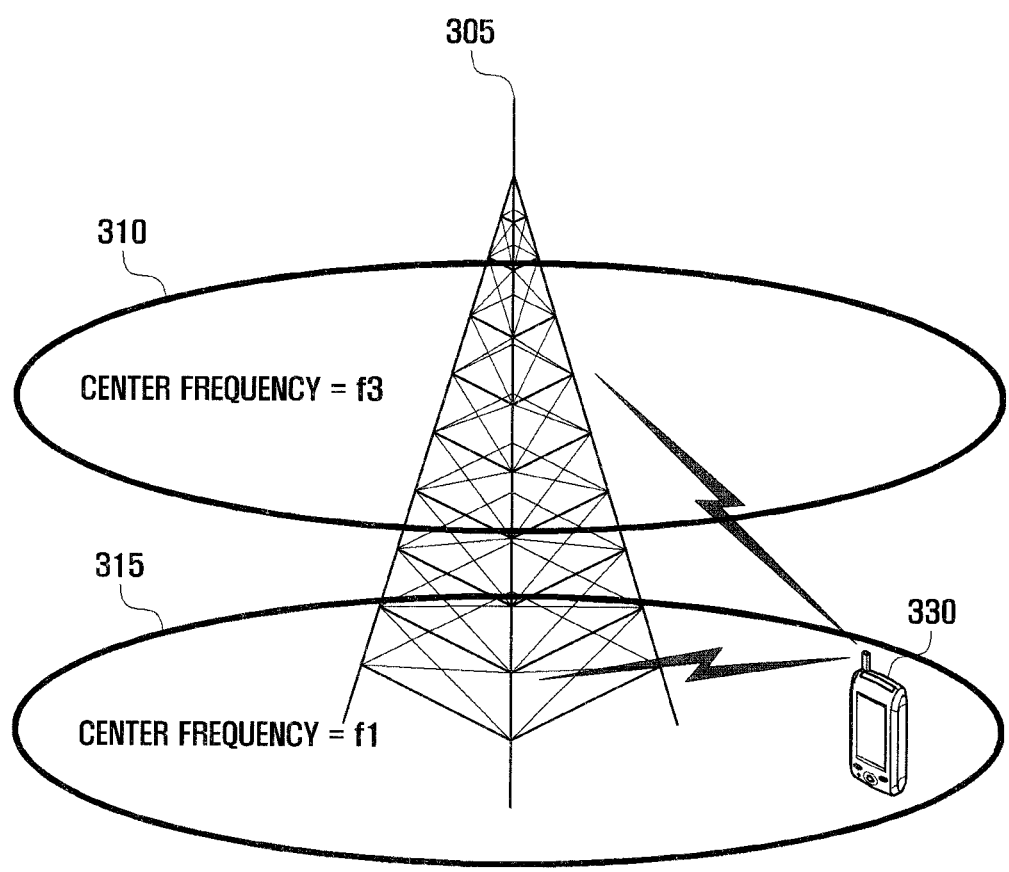
FIG. 3 is a diagram illustrating an exemplary situation of carrier aggregation in the LTE system according to an exemplary embodiment of the present invention.

FIG. 3 is a diagram illustrating an exemplary situation of carrier aggregation in an LTE system according to an exemplary embodiment of the present invention is applied.

Referring to FIG. 3, an eNB typically uses multiple carriers transmitted and received in different frequency bands. For example, the eNB 305 may be configured to use the carrier 315 with center frequency f1 and the carrier 310 with center frequency f3. If carrier aggregation is not supported, the UE 330 has to transmit/receive data unit one of the carriers 310 and 315. However, the UE 330 having the carrier aggregation capability may transmit/receive data using both the carriers 310 and 315. The eNB may increase the amount of the resource to be allocated to the UE having the carrier aggregation capability in adaptation to the channel condition of the UE so as to improve the data rate of the UE. The technique of aggregating the downlink and uplink carriers is referred to as carrier aggregation.

The terms used frequently in the description are explained below.

When a cell is configured with one downlink carrier and one uplink carrier, the carrier aggregation may be understood as if the UE communicates data via multiple cells. With the use of carrier aggregation, the maximum data rate increases in proportion to the number of aggregated carriers.

In the following description, the phrase "the UE receives data through a certain downlink carrier" or "the UE transmits data through a certain uplink carrier" denotes transmitting or receiving data through control and data channels provided in a cell corresponding to center frequencies and frequency bands of the downlink and uplink carriers. Although the description herein is directed to an LTE mobile communication system for convenience of explanation, exemplary embodiments of the present invention may be applied to other types of wireless communication systems supporting carrier aggregation.

The User Service Description (USD) is a protocol defined for transmitting to the UE receiving MBMS service the information on the broadcast service (program information and schedules). The USD is transmitted to the UE using higher layer protocol such as Hypertext Transfer Protocol (HTTP) and provides the UE with the information on the programs and broadcast schedule.

Figure 4:
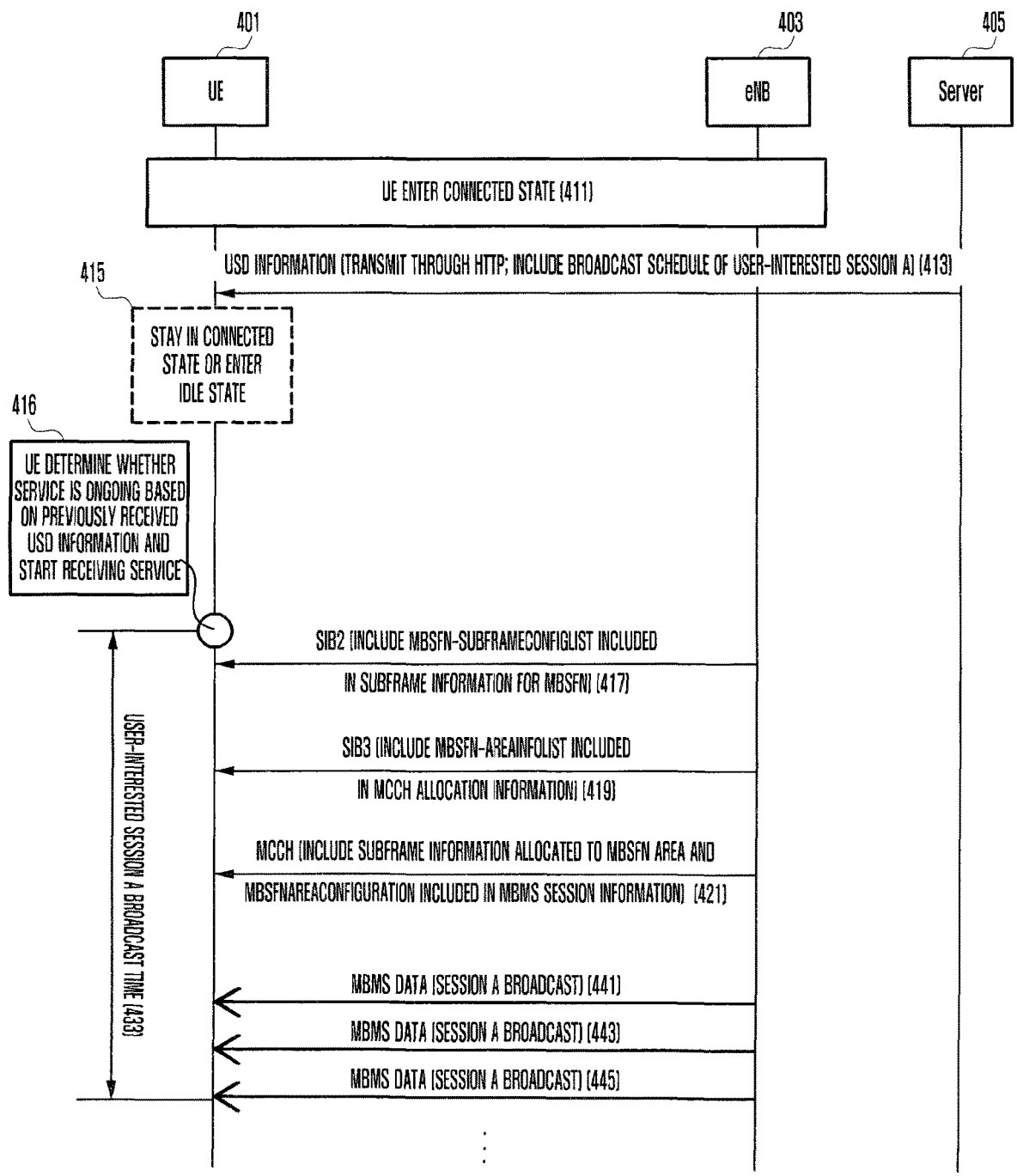
FIG. 4 is a signaling diagram illustrating an MBMS service reception method of a UE according to an exemplary embodiment of the present invention.

FIG. 4 is a signaling diagram illustrating an MBMS service reception method of a UE according to an exemplary embodiment of the present invention.

The UE 401 connects to the eNB 403 such that the UE 401 and the eNB 403 enter the connected mode at step 411. In the connected mode, the UE 401 is capable of communicating data with the eNB 403. Afterward, the eNB 401 receives User Service Description (USD) information from the server 405 at step 413.

The USD information is the protocol defined in Extensible Markup Language (XML) for transmitting the information on the broadcast service (program information, program schedule, etc.) and transmitted to the UE through a higher layer protocol such as Hypertext Transfer Protocol (HTTP). The UE 401 is capable of acquiring the information on the broadcast times of the programs and the frequency bands carrying the respective broadcast programs based from the USD information.

In the following description with reference to FIG. 4, it is assumed that the user receives a broadcast of session A on which information is included in the USD information for the simplicity purpose. The information on the session A is capable of including the time information on the session A (e.g. the session A will be on air between 3 and 4 PM).

After receiving the USD information, the UE 401 is capable of staying in the connected mode or transitioning to the idle mode at step 415.

Among the eNBs providing the MBMS services, a set of the eNBs providing the same service is referred to as Multimedia Broadcast/Multicast service Single Frequency Network (MBSFN) and broadcasts the same MBSFN-related resource allocation and session information.

The UE 401 determines, based on the time information about a specific session (session A in this example) included in the received USD information, whether the session has started and, if so, receives the MBMS service at step 416.

The UE 401 is capable of performing cell reselection to an eNB providing the service session to receive.

According to an exemplary embodiment of the present invention, the UE 401 obtains the time information included in the USD information to determine the start time of session A at 3 AM and starts receiving the MBMS service. If the MBMS session has not started, the UE determines, based on the time information about the MBMS session, whether the MBMS session is ongoing and if so, selects the eNB providing the MBMS service as the cell reselection target eNB based on the MBMS session frequency information to receive the MBMS service of the MBMS session.

The MBMS service reception procedure is as follows. The UE is capable of receiving a System Information Block (SIB) including the indication indicating the Multimedia Broadcast multicast service Single Frequency Network (MBSFN) subframe and another SIB including the resource allocation location information carrying Multicast Control Channel (MCCH) and the indicator indicating the location of the subframe used for carrying the MBSFN data and the session information on the currently provided service, MCCH based on the information included in the latter SIB, and the MBSFN data based on the MCCH.

The UE 401 receives the System Information Block 2 (SIB2) from the eNB 403 at step 417. The MBSFN-SubframeConfigList IE included in the SIB2 indicates the subframes that may be used for the purpose of MBSFN transmission. The MBSFN-SubframeConfigList IE includes MBSFN-SubframeConfig IE which indicates which subframes of which radio frames may be used as the MBSFN subframes. The MBSFN-SubframeConfig IE includes radioFrameAllocationPeriod and radioFrameAllocationOffset parameters in order to indicate which radio frame is MBSFN-related frame, and the MBMS service is provided in the radio frame satisfying Equation (1):

$$\text{SFN mod radioFrameAllocationPeriod} = \text{radioFrameAllocationOffset} \quad (1)$$

where SFN denotes a System frame number indicating the radio frame number and repeats in the range from 0 to 1023.

The MBSFN-SubframeConfig IE also includes a subframeAllocation parameter indicating the MBSFN-related subframe in the form of a bitmap to indicate which subframe is MBSFN subframe in the radio frame indicated by Equation (1).

The MBSFN subframe may be indicated in unit of one radio frame or four radio frames. In the case of using one radio frame unit, oneFrame IE is used. The MBSFN subframe may be one of the 1st, 2nd, 3rd, 6th, 7th, and 8th subframes among the total 10 subframes constituting one radio subframe. Accordingly, oneFrame IE indicates the MBSFN subframes among the above enumerated subframes using 6 bits. In the case of using four radio frames unit, fourFrames IE is used. In order to cover the four radio frames, total 24 bits are used to indicate the MBSFN subframes among the above enumerated subframes of each radio frame. Accordingly, the UE 401 is capable of identifying the subframes that may be used as MBSFN subframes based on the MBSFN-SubframeConfigList IE.

If it is intended to receive the MBMS service, the UE 401 receives SIB13 from the eNB 403 at step 419. The MBSFN-AreaInfoList IE of the SIB13 includes the resource allocation location information for transmitting the multicast control channel (MCCH) per MBSFN area that is provided by the cell. The UE 401 receives the MCCH using the resource allocation location information at step 421.

The MBSFNAreaConfiguration IE of the MCCH includes the indicator indicating the location of the subframe used for MBSFN data transmission in the MBSFN area and the information on the session of the current service. The UE 401 is capable of receiving specific MBSFN subframes using such information. If the service of session A is not received even though the session is ongoing (i.e. current time is between the start time and the end time), the UE 401 performs cell reselection based on the frequency information in the USD information received at step 413 rather than immediately.

After receiving the specific MBSFN subframe based on the information included in the mbsfnAreaConfiguration IE of the MCCH, the UE 401 receives the control message, i.e. MCH scheduling information MAC Control Element, to identify the location of the actual MBSFN subframe carrying the interested data.

Through the above procedure, the UE 401 is capable of receiving the MBSFN data at steps 441, 443, and 445. The MBMS service reception method according to an exemplary embodiment of the present invention is advantageous to receive the service at an intended time based on the USD information received at step 413 without needing to determine whether the current session A is actually serviced by receiving the MCCH carrying the MBSFNAreaConfiguration information for receiving the intended service of session A.

Figure 5:
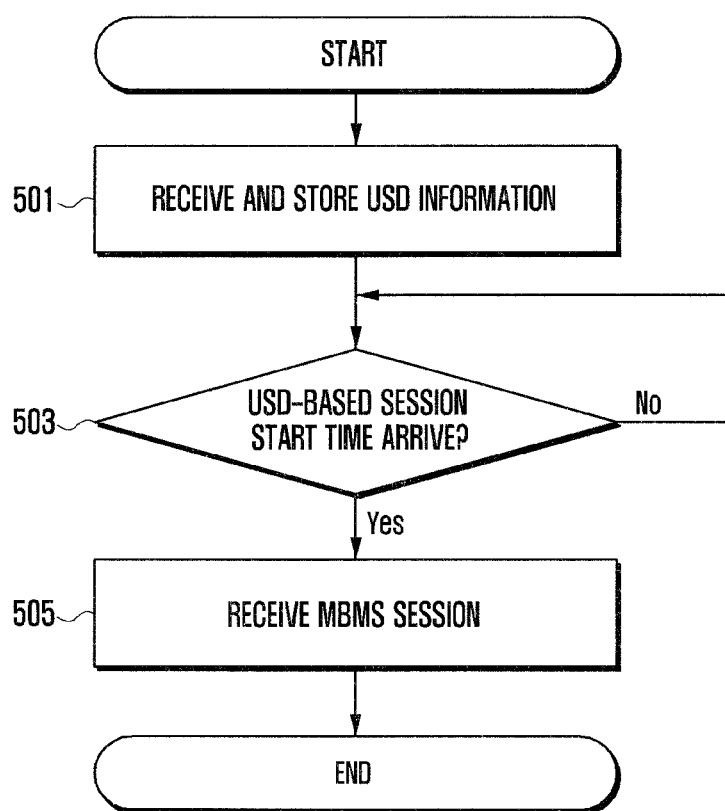
FIG. 5 is a flowchart illustrating a UE procedure for receiving MBMS service according to an exemplary embodiment of the present invention.

FIG. 5 is a flowchart illustrating a UE procedure for receiving MBMS service according to an exemplary embodiment of the present invention.

Referring to FIG. 5, the UE first receives the USD information in the connected mode at step 501. As described above with reference to FIG. 4, the USD information includes the information related to the broadcast service (program information, time schedule, etc.). The UE is capable of identifying the information on the start and end times of the service intended to receive and frequency carrying the corresponding service based on the USD information.

The UE determines whether the start time of the service intended to receive arrives based on the USD information at step 503. If it is determined that the start time of the MBMS session has arrived, the UE starts receiving the service of the session at the start time, although no MBSFN-related information is received additionally, at step 505. The UE is capable of performing cell reselection procedure to the eNB using the frequency carrying the MBMS service based on the frequency information included in the received USD information and receiving the MBMS service through a series of processes.

Figure 6:
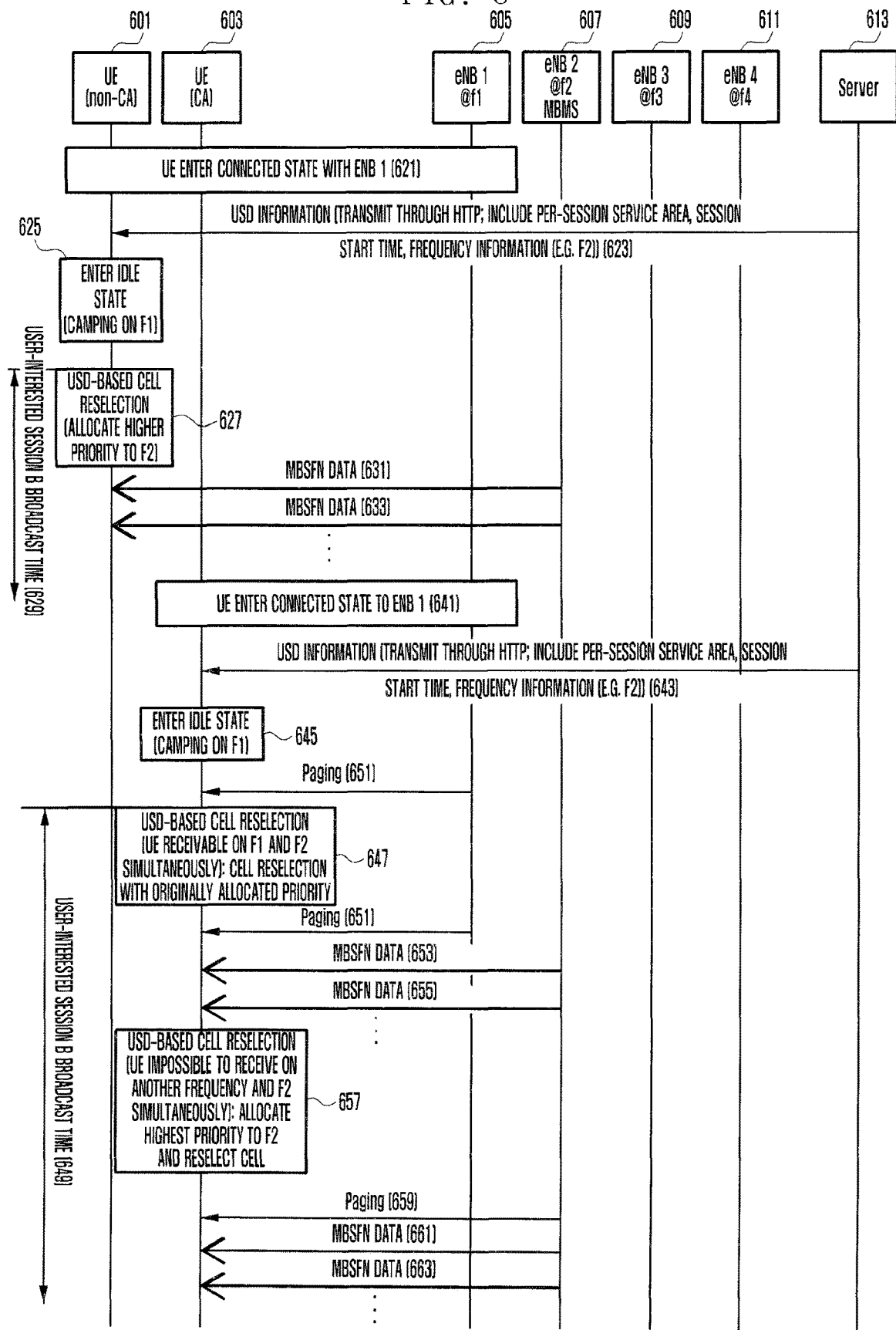
FIG. 6 is a signaling diagram illustrating an MBMS service reception method of a UE according to an exemplary embodiment of the present invention.

FIG. 6 is a signaling diagram illustrating an MBMS service reception method of a UE according to another exemplary embodiment of the present invention.

Referring to FIG. 6, the description is made of the case of a UE 601 capable of receiving the service on only one carrier and another UE 603 capable of receiving the service on multiple carriers separately with reference to FIG. 6. The UE capable of receiving service on multiple carriers may be a UE capable of carrier aggregation.

A description is made of the UE 601 capable of receiving service on a single carrier. The UE 601 connects to the eNB 1 605 to enter the connected mode at step 621. In the connected mode, the UE 601 is capable of communicating data with the eNB 605. The UE 601 in connected mode receives the USD information from the server 613 at step 623.

As described above, the USD information is a protocol defined in XML to transmit the information on the broadcast service (program information, broadcast schedule, etc.) and transmitted to the UE 601 using the higher layer protocol such as HTTP. The UE 601 is capable of identifying the broadcast programs and the service times of the broadcast programs and frequencies carrying the services.

In the following description, it is assumed that the user is interested in receiving session B broadcast and the USD information includes the information on the session B. The information on the session B may include the information on the frequency of the session B (e.g. session B is serviced on frequency f2). The frequency information may be expressed as E-UTRA Absolute Radio Frequency Channel Number (EARFCN) to provide the UE with accurate frequency information.

The UE 601 enters the idle mode at step 625. The UE 601 in idle mode selects an eNB to camp on according to the cell reselection rule for roaming across cells. In FIG. 6, it is assumed that the UE 601 operates on the serving frequency f1 with neighbor frequencies f2, f3, and f4 and the interested MBMS session is established on the frequency C. The eNBs 607, 609, and 611 operate on the neighbor frequencies f2, f3, and f4, respectively.

The UE 601 knows that the interested session is serviced on the frequency f2 and thus configures the priority of f2 to the highest priority at the start time of the session based on the USD information at step 627. The UE 601 is also capable of identifying the broadcast time 629 of the session B intended to receive based on the USD information. The UE receiving or intended to receive the MBMS service on the MBSFN f2 is capable of receiving the MBMS service on only the above MBSFN, the corresponding frequency is configured to keep the highest priority for the UE to continue receiving the MBMS service. The UE 601 performs cell reselection onto f2 to receive the MBMS services from the eNB 2 at step 631 and 633.

A description is made of the UE 603 capable of receiving the service on multiple carriers simultaneously. The UE 603 connects to the eNB 605 to enter the connected mode at step 641. In the connected mode, the UE 603 is capable of communicating data with the eNB 605. The UE 603 in connected mode receives the USD information from the server 613 at step 643.

The UE 603 enters the idle mode at step 645. The UE 603 in idle mode selects an eNB to camp one according to the cell reselection rule for roaming across cells.

The UE 603 knows that the interested session is serviced on the frequency f2 and thus determines whether it is possible to receive the service additionally on the frequency f2 on the frequency band of f1 to which the UE 603 has camped on at step 647. If it is determined that the UE is capable of receiving the service on both the frequencies f1 and f2, the UE 603 performs the cell reselection method of the related art. The UE 603 sets the priority of the f2 to the highest priority at the start time of the session and performs cell reselection. The UE 603 is capable of identifying the broadcast time 649 of the session B intended to receive based on the USD information.

In FIG. 6, it is assumed that, when it has camped on f1, the UE 603 is capable of receiving the service on f2 simultaneously. In this case, since the UE 603 has camped on f1, the UE 603 receives the paging message from the eNB 1 605 to determine whether new downlink data occurs periodically at step 651. Since the UE 603 is capable of receiving the service on multiple carriers, the UE 603 may receive the UE-interested MBMS service from neighbor cells at steps 653 and 655, using the frequency information (here, frequency f2) in the USD information received at step 643.

It is assumed that the UE 603 capable of receiving on multiple frequencies moves so as to perform cell reselection again. If it is necessary to perform cell reselection, the UE 603 determines whether it is possible to receive the service on another frequency along with f2 simultaneously as in the above case. In FIG. 6, it is assumed that the simultaneous reception from eNBs other than f2 is impossible. The UE 603 sets the priority of f2 to the highest and performs cell reselection. That is, the UE 603 camps on the eNB 2 607 at step 657. Accordingly, the UE 603 receives the paging message from the eNB 2 607 periodically at step 659 to determine whether new downlink data occurs and continues receiving MBMS data from the eNB 2 607 at steps 661 and 663.

Figure 7:
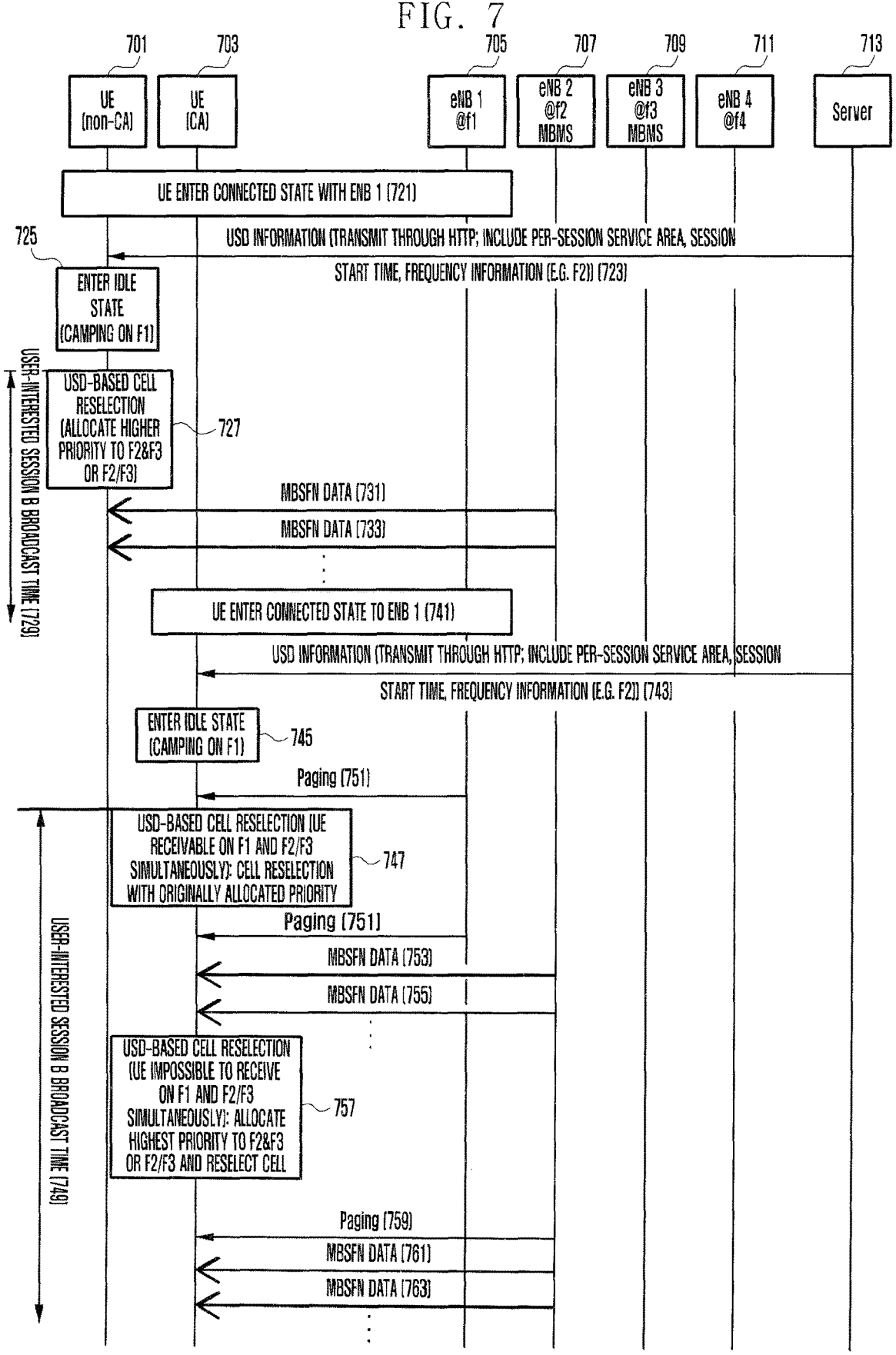
FIG. 7 is a signaling diagram illustrating an MBMS service reception method of a UE according to an exemplary embodiment of the present invention.

FIG. 7 is a signaling diagram illustrating an MBMS service reception method of a UE according to another exemplary embodiment of the present invention.

Referring to FIG. 7, the description is made of the case of a UE 701 capable of receiving the service on only one carrier and another UE 703 capable of receiving the service on multiple carriers separately with reference to FIG. 7. The UE capable of receiving service on multiple carriers may be a UE capable of carrier aggregation.

A description is made of the UE 701 capable of receiving service on a single carrier. The UE 701 connects to the eNB 705 at step 721 to enter the connected mode at step 721. In the connected mode, the UE 701 is capable of communicating data with the eNB 705. The UE 701 in connected mode receives the USD information from the server 713 at step 723.

As described above, the USD information is a protocol defined in XML to transmit the information on the broadcast service (program information, broadcast schedule, etc.) and transmitted to the UE 701 using the higher layer protocol such as HTTP. The UE 701 is capable of identifying the broadcast programs and the service times of the broadcast programs and frequencies carrying the services.

In the following description, it is assumed that the user is interested in receiving session B broadcast and the USD information includes the information on the session B. The information on the session B may include the information on the frequency of the session B (e.g. session B is serviced on frequencies f2 and f3). The frequency information may be expressed as E-UTRA Absolute Radio Frequency Channel Number (EARFCN) to provide the UE with accurate frequency information.

The UE 701 enters the idle mode at step 725. The UE 701 in idle mode selects an eNB to camp on according to the cell reselection rule for roaming across cells. In FIG. 7, it is assumed that the UE 701 operates on the serving frequency f1 with neighbor frequencies f2, f3, and f4 and the interested MBMS session is established on the frequencies f2 and f3. The eNBs 707, 709, and 711 operate on the neighbor frequencies f2, f3, and f4, respectively.

The UE 701 knows that the interested session is serviced on the frequencies f2 and f3 and thus configures the priority of at least one of f2 and f3 to the highest priority at the start time of the session based on the USD information at step 727. The UE 701 is also capable of identifying the broadcast time 729 of the session B intended to receive based on the USD information. The UE 701 receiving or intended to receive the MBMS service on the MBSFN f2 or f3 is capable of receiving the MBMS service in only the above MBSFN, the corresponding frequency is configured to keep the highest priority for the UE to continue receiving the MBMS service. The UE 701 performs cell reselection onto f2 to receive the MBMS services from the eNB 2 at step 731 and 733.

A description is made of the UE 703 capable of receiving the service on multiple carriers simultaneously. The UE 703 connects to the eNB 705 to enter the connected mode at step 741. In the connected mode, the UE 703 is capable of communicating data with the eNB 705. The UE 703 in connected mode receives the USD information from the server 713 at step 743.

The UE 703 enters the idle mode at step 745. The UE 603 in idle mode selects an eNB to camp on according to the cell reselection rule for roaming across cells.

The UE 703 knows that the interested session is serviced on the frequency f2 and thus determines whether it is possible to receive the service additionally on the frequency f2 or f3 on the frequency band of f1 to which it has camped on at step 747.

If it is determined that the UE is capable of receiving the service on the frequencies f1 and one of f2 and f3, the UE 703, performs the cell reselection method of the related art. The UE 703 sets the priority of the f2 or f3 to the highest priority at the start time of the session and performs cell reselection. The UE 703 is capable of identifying the broadcast time 749 of the session B intended to receive based on the USD information.

In FIG. 7, it is assumed that, when it has camped on f1, the UE 603 is capable of receiving the service on f1 and one of f2 and f3 simultaneously. In this case, since it has camped on f1, the UE 703 receives the paging message from the eNB 1 705 to determine whether new downlink data occurs periodically at step 751. Also, since the UE 703 is capable of receiving the service on multiple carriers, the UE 703 may receive the UE-interested MBMS service from neighbor cells at steps 753 and 755, using the frequency information (here, frequencies f2 and f3) in the USD information received at step 743. In FIG. 7, it is depicted that the service is received from the eNB 2 707.

Suppose that the UE 703 capable of receiving on multiple frequencies moves so as to perform cell reselection again. If it is necessary to perform cell reselection, the UE 703 determines whether it is possible to receive the service on other frequency along with f2 or f3 simultaneously as in the above case. In FIG. 7, it is assumed that the simultaneous reception from other eNB than f2 or f3 is impossible. The UE 703 sets the priorities of f2 and f3 to the highest and performs cell reselection. That is, the UE 703 camps on the eNB 2 707 or eNB 3 709 at step 757. Accordingly, at step 759, the UE 703 receives the paging message from the eNB 2 707 or the eNB 3 709 periodically to determine whether new downlink data occurs and continues receiving MBMS data from the eNB 2 707 or the eNB 3 709 at steps 761 and 763. In FIG. 7, it is depicted that the service is received from the eNB 707.

Figure 8:
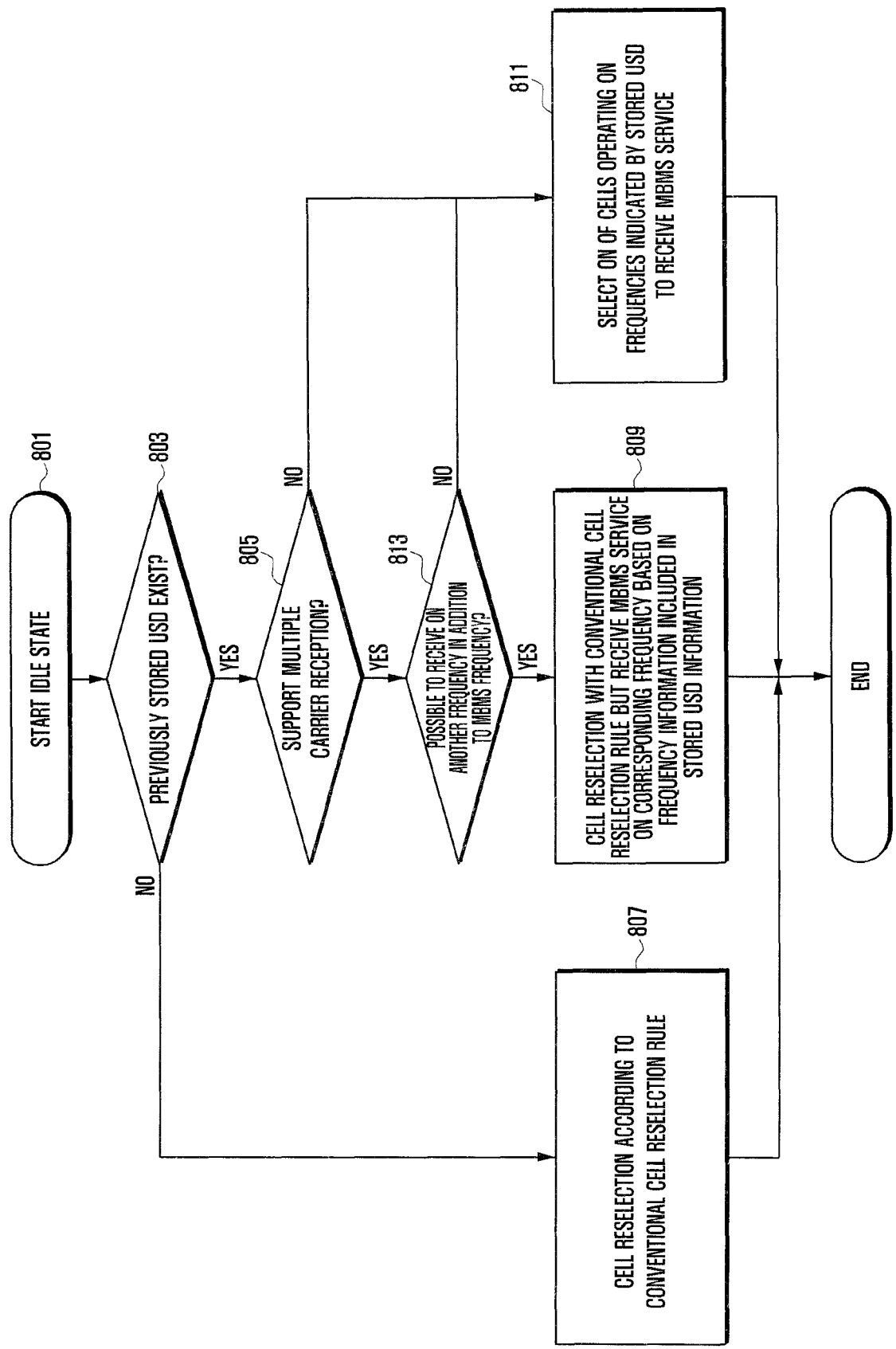
FIG. 8 is a flowchart illustrating a frequency selection procedure of the UE for receiving MBMS service according to an exemplary embodiment of the present invention.

FIG. 8 is a flowchart illustrating a frequency selection procedure of the UE for receiving MBMS service according to an exemplary embodiment of the present invention.

The UE first enters the idle mode at step 801. The UE determines whether the USD information has been previously received from the server at step 803. The USD information is capable of including the information on the frequency carrying the MBMS service. If it is determined that there is no previously stored USD information at step 803, the UE performs the cell reselection according to the related art (i.e., select new eNB when cell reselection is required due to a reason such as roaming approval) at step 807.

Otherwise, if it is determined that there is previously stored USD information at step 803, the UE determines whether it supports multiple carrier reception at step 805. If it is determined that the UE supports multiple carrier reception at step 805, the procedure goes to step 811 and, otherwise, step 813. The multiple carrier reception capability may be determined by the UE or an embedded feature of the UE. In case that the multiple carrier reception capability is the feature of the UE, step 805 may be omitted and the procedure goes to step 811 for the UE capable of single carrier reception and step 813 for the UE capable of multiple carrier reception.

At step 811 for cell reselection, the UE selects one of the eNBs corresponding to the cells operating on the frequencies indicated by the stored USD information to receive the MBMS service on the corresponding frequency.

At step 813 for cell reselection, the UE determines whether it is possible to receive the service on another frequency along with the current frequency on which the MBMS service is provided based on the USD information. If it is possible to receive the service on another frequency along with the current frequency, the UE performs cell reselection according to the conventional cell reselection method (select new eNB when cell reselection is required due to a reason such as roaming approval) at step 809; however, since it is possible to receive the service on multiple carriers, the UE adds the frequency band indicated by the stored USD information and receive the MBMS service on the corresponding frequency.

If it is determined that the UE cannot receive the service on another frequency (i.e. it is impossible to select a frequency other than the frequency carrying the MBMS service), the procedure goes to step 811 at which the UE selects the eNB corresponding to one of the cells operating on the frequencies indicated by the stored USD information and receives the MBMS service on the corresponding frequency.

Figure 9:
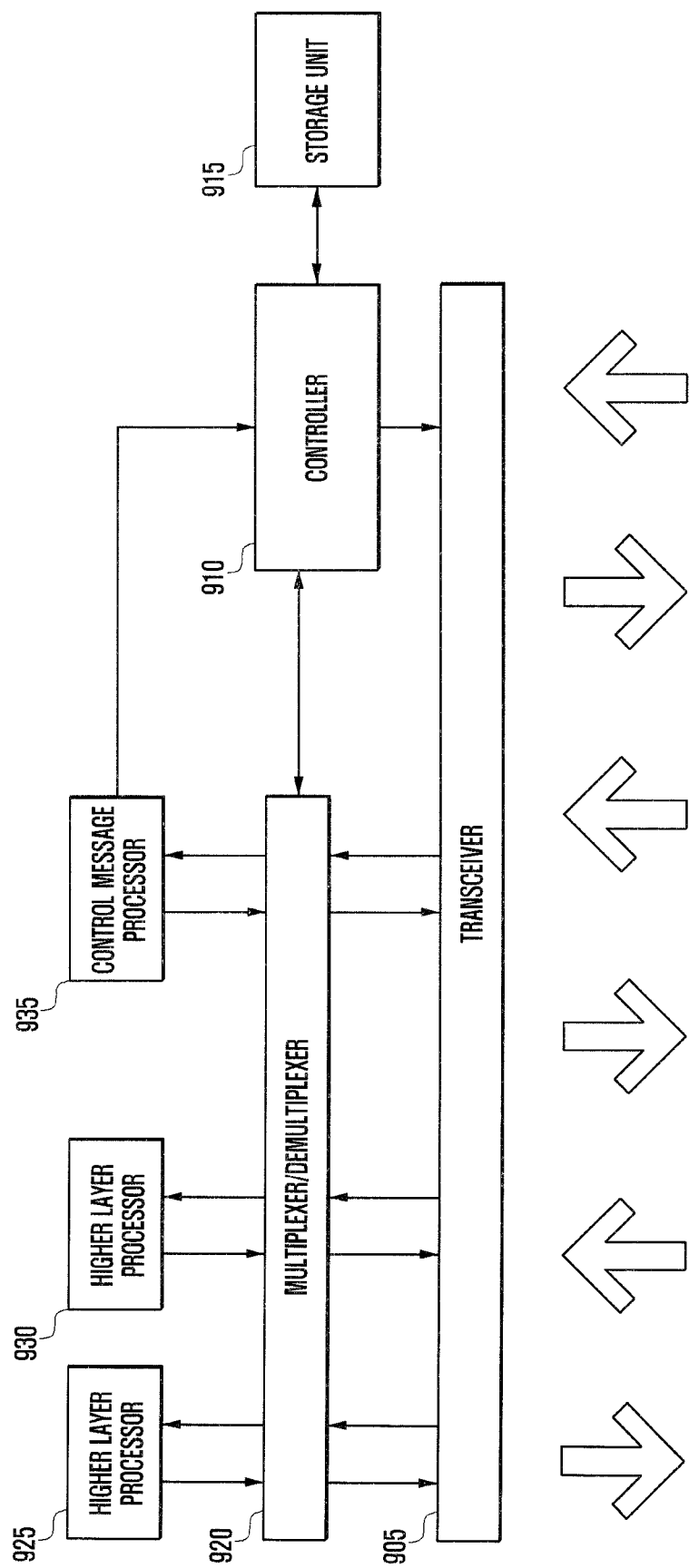
FIG. 9 is a block diagram illustrating a configuration of a UE according to an exemplary embodiment of the present invention.

FIG. 9 is a block diagram illustrating a configuration of a UE according to an exemplary embodiment of the present invention.

Referring to FIG. 9, the UE includes a transceiver 905, a controller 910, a storage unit 915, a multiplexer/demultiplexer 920, higher layer processors 925 and 930, and a control message processor 935. The UE may include additional units not shown here for the purpose of clarity.

The transceiver 905 receives data and control signals through a downlink channel of the serving cell and transmits data and control signal through an uplink channel. In the case that multiple serving cells are configured, the transceiver 905 is capable of transmitting and receiving data con control signals through multiple serving cells.

The storage unit 915 is responsible for storing program data related to the operations of the UE and may be divided into a program region and a data region. The storage unit 915 may be implemented with at least one of volatile and nonvolatile storage media. The volatile media include semiconductor memories such as RAM, DRAM, and SRAM, and the nonvolatile media include hard disk. In the present invention, the storage unit 915 is capable of the received USD information.

The multiplexer/demultiplexer 920 multiplexes the data generated by the higher layer processors 925 and 930, and the control message processor 935, and demultiplexes the data received by the transceiver 905 to deliver the demultiplexed data to appropriate processors, i.e. the higher layer processors 925 and 930, and the control message processor 935.

The higher layer processors 925 and 930 are configured per service to process the data generated by a user service, such as File Transfer Protocol (FTP) and Voice over Internet Protocol (VoIP). The higher layer processors 925 and 930 transfer the processed data to the multiplexer/demultiplexer 920, and process the data from the multiplexer/demultiplexer 920, and deliver the processed data to the service application running on the higher layer.

The controller 910 identifying the scheduling command, e.g. uplink grant, received by the transceiver 905 and controls the transceiver 905 and the multiplexer/demultiplexer 920 to perform uplink transmission with appropriate transmission resource at appropriate timing. The controller 910 controls the transceiver by taking notice of the DRX operation and CSI/SRS transmission. The controller 910 is capable of controlling the overall operations for receiving the multimedia broadcast service in the radio communication system as described above.

Figure 10:
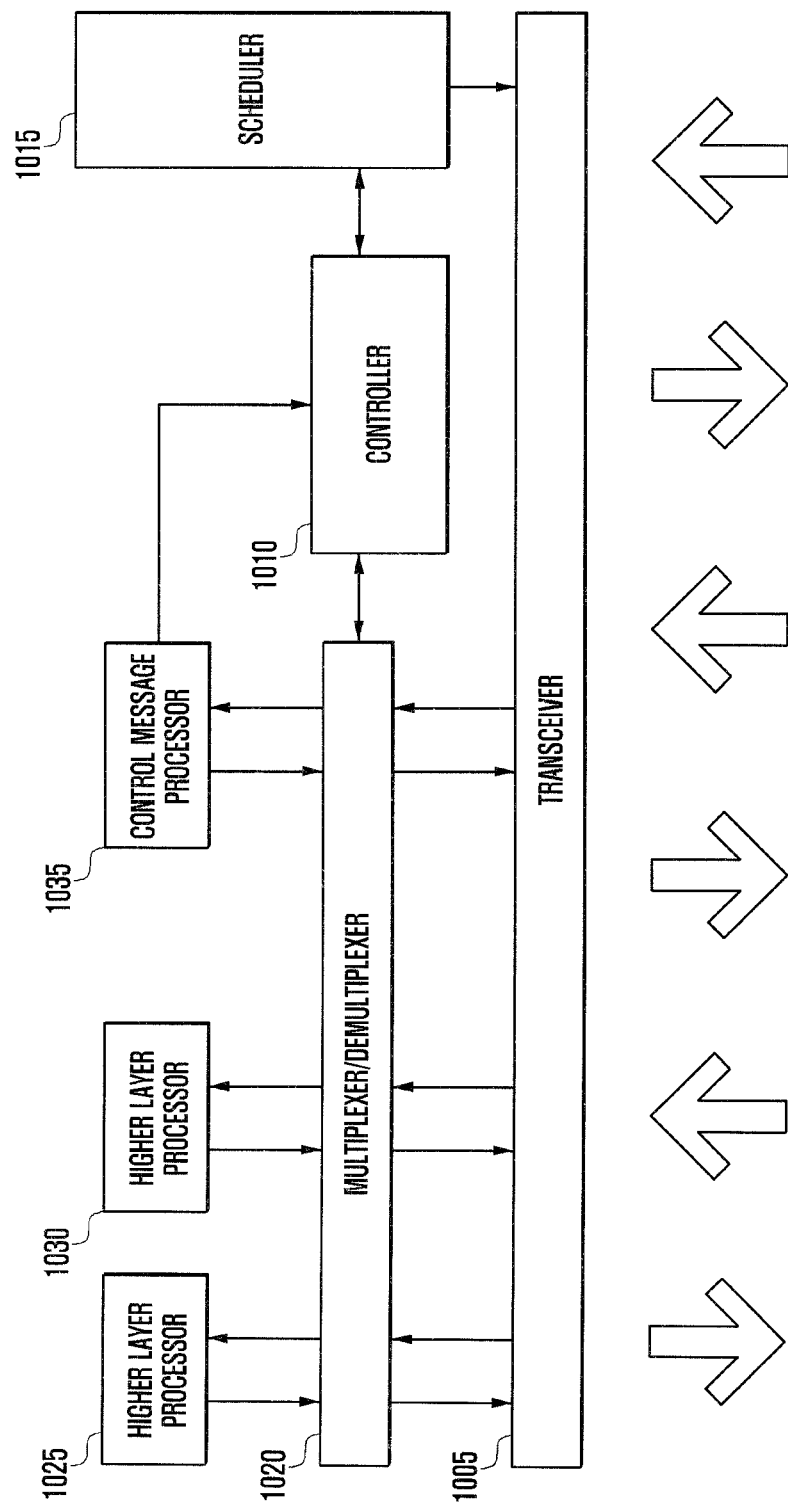
FIG. 10 is a block diagram illustrating a configuration of the eNB according to an exemplary embodiment of the present invention.

FIG. 10 is a block diagram illustrating a configuration of the eNB according to an exemplary embodiment of the present invention.

Referring to FIG. 10, the eNB includes a transceiver 1005, a controller 1010, a scheduler 1015, a multiplexer/demultiplexer 1020, various higher layer processors 1025 and 1030 and a control message processor 1035. The eNB may include additional units not shown here for purposes of clarity.

The transceiver 1005 transmits data and control signals on a downlink carrier and receives data and control signals on an uplink carrier. When multiple carriers are configured, the transceiver 1005 transmits and receives the data and control signals on the multiple carriers.

The multiplexer/demultiplexer 1020 multiplexes the data generated by the higher layer processors 1025 and 1030 and the control message processor 1035 and demultiplexes the data received by the transceiver 1005 to deliver the demultiplexed data to at least one of the higher layer processors 1025 and 1030 and the control message processor 1035 and the controller 1010. The control message processor 1035 processes the message transmitted by the UE and takes a necessary action or generates a control message to be transmitted to the UE to the higher layer.

The higher layer processors 1025 and 1030 are configured per UE per service to process the data generated by a user service, such as File Transfer Protocol (FTP) and Voice over Internet Protocol (VoIP). The higher layer processors 1025 and 1030 transfer the processed data to the multiplexer/demultiplexer 1020, process the data from the multiplexer/demultiplexer 1020, and deliver the processed data to the service application running on the higher layer.

The controller 1010 controls the transceiver according to the CSI/SRS transmission timing of the UE.

The scheduler 1015 allocates transmission resource to the UE at an appropriate time in consideration of the buffer status of the UE, channel status, and active time of the UE; and controls the transceiver to process the signals transmitted by the UE or to be transmitted to the UE.

As described above, the MBMS service reception method and apparatus according to exemplary embodiments of the present invention is capable of facilitating reception of the MBMS service.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for transmitting Multimedia Broadcast/Multicast Service (MBMS) to a terminal that receives a wireless communication service, the method comprising:
    transmitting, to a terminal in a connected state, user service description (USD) information including time information and frequency information on a first frequency, wherein the USD information is provided by an upper layer based on extensible markup language (XML), the frequency information indicates a second frequency providing a MBMS service via a MBMS Single Frequency Network (MBSFN) which the terminal is interested in receiving, and the time information includes a start time of an MBMS session corresponding to the MBMS service and an end time of the MBMS session; and
    transmitting, to the terminal in the connected state, the MBMS service of the MBMS session based on the USD information on the second frequency,
    wherein the terminal determines whether the MBMS session is ongoing based on the start time and the end time provided by the upper layer in the USD information,
    wherein the terminal in an idle state determines whether the terminal can only receive the MBMS service while camping on the second frequency providing the MBMS service based on the frequency information, and
    wherein, if the MBMS session is ongoing and the terminal can only receive the MBMS service while camping on the second frequency, the terminal in the idle state determines the second frequency as a highest priority frequency for a cell reselection for the wireless communication service during the MBMS session.

2. The method of claim 1, wherein, at the start time of the MBMS session, the terminal determines the frequency as the highest priority frequency for the cell reselection.

3. The method of claim 2,
    wherein, before the start time of the MBMS session, the terminal is camped on an initial frequency.

4. The method of claim 3, wherein, at the start time of the MBMS session, the terminal is forced to reselect to the frequency providing the MBMS service.

5. The method of claim 4, wherein the terminal cannot simultaneously receive the frequency providing the MBMS service and the initial frequency.

6. The method of claim 5, wherein the initial frequency comprises better signal characteristics than the frequency providing the MBMS service.

7. A method for receiving Multimedia Broadcast/Multicast Service (MBMS) by a terminal that receives a wireless communication service, the method comprising:
    receiving a user service description (USD) information on a first frequency when the terminal is in a connected state;
    obtaining frequency information indicating which frequency provides an MBMS service via a MBMS Single Frequency Network (MBSFN) which the terminal is interested in receiving, from the USD information;
    entering an idle mode;
    determining cell reselection priorities based on the frequency information included in the USD information;
    performing a cell reselection for the wireless communication service based on the cell reselection priorities; and
    receiving the MBMS service from a reselected cell,
    wherein the determining of the cell reselection priorities comprises:
        determining whether the terminal can only receive the MBMS service while camping on a second frequency providing the MBMS service based on the frequency information provided in the USD information, and
        determining the second frequency as a highest priority of the cell reselection during an MBMS session corresponding to the MBMS service if the terminal can only receive the MBMS service while camping on the second frequency.

8. The method of claim 7, wherein the USD information further comprises time information of the MBMS session, and the time information indicates a start time and an end time of the MBMS session.

9. The method of claim 7, wherein, the cell reselection priorities are determined at a start time of the MBMS service.

10. The method of claim 9, wherein, before the start time of the MBMS service, the terminal is camped on an initial frequency.

11. The method of claim 10, wherein, at the start time of the MBMS service, the terminal is forced to reselect to the frequency providing the MBMS service.

12. The method of claim 11, wherein the terminal cannot simultaneously receive the frequency providing the MBMS service and the initial frequency.

13. The method of claim 12, wherein the initial frequency comprises better signal characteristics than the frequency providing the MBMS service.

* * * * *